Oct. 30, 1962  R. L. DICKEY  3,060,917
HOLDER FOR HANDLING STONE AND THE LIKE
Filed May 16, 1960  3 Sheets-Sheet 1

INVENTOR.
Roger L. Dickey
BY
ATTORNEY.

Oct. 30, 1962  R. L. DICKEY  3,060,917
HOLDER FOR HANDLING STONE AND THE LIKE
Filed May 16, 1960  3 Sheets-Sheet 2
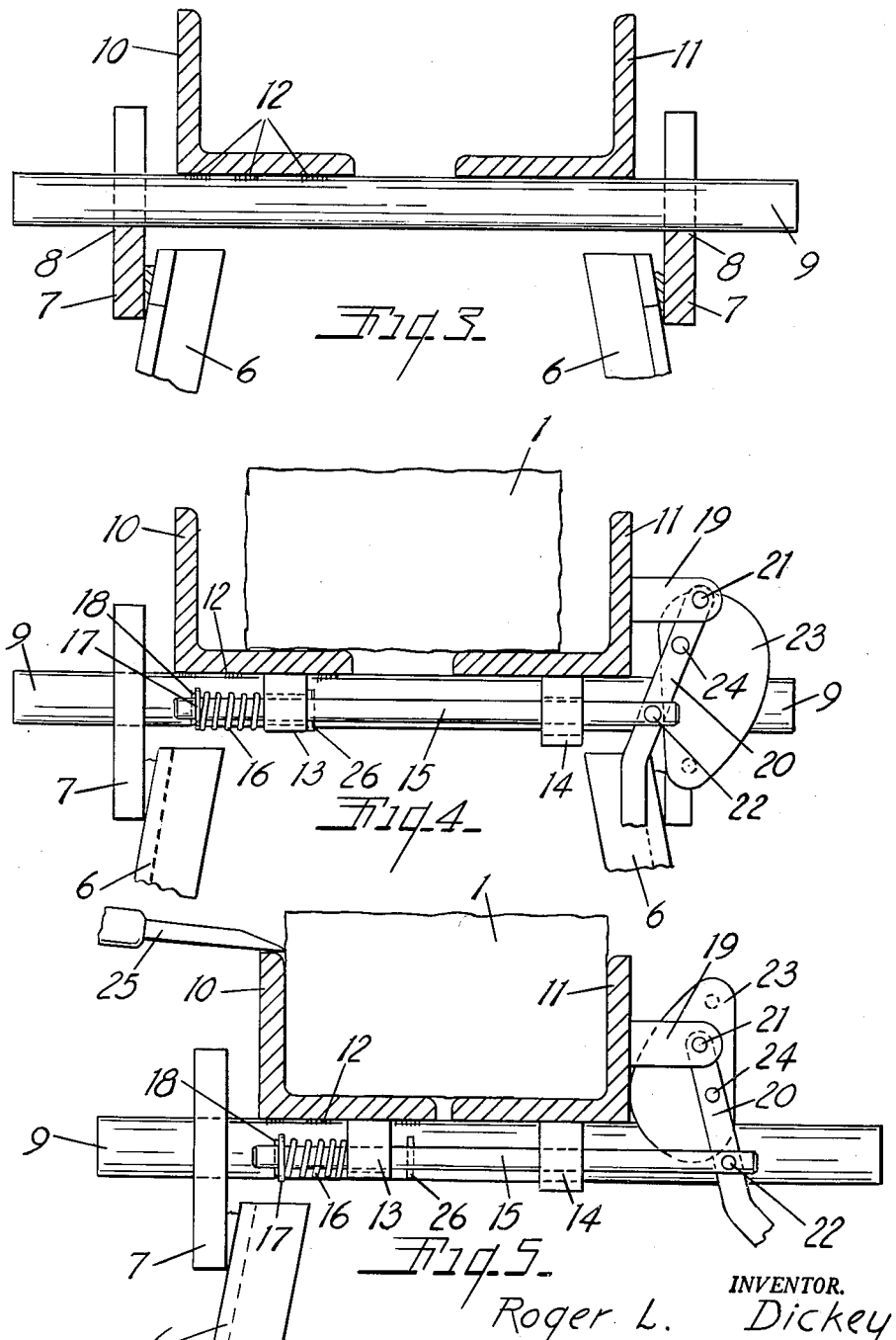
INVENTOR.
Roger L. Dickey
BY
ATTORNEY.

Oct. 30, 1962  R. L. DICKEY  3,060,917
HOLDER FOR HANDLING STONE AND THE LIKE
Filed May 16, 1960  3 Sheets-Sheet 3
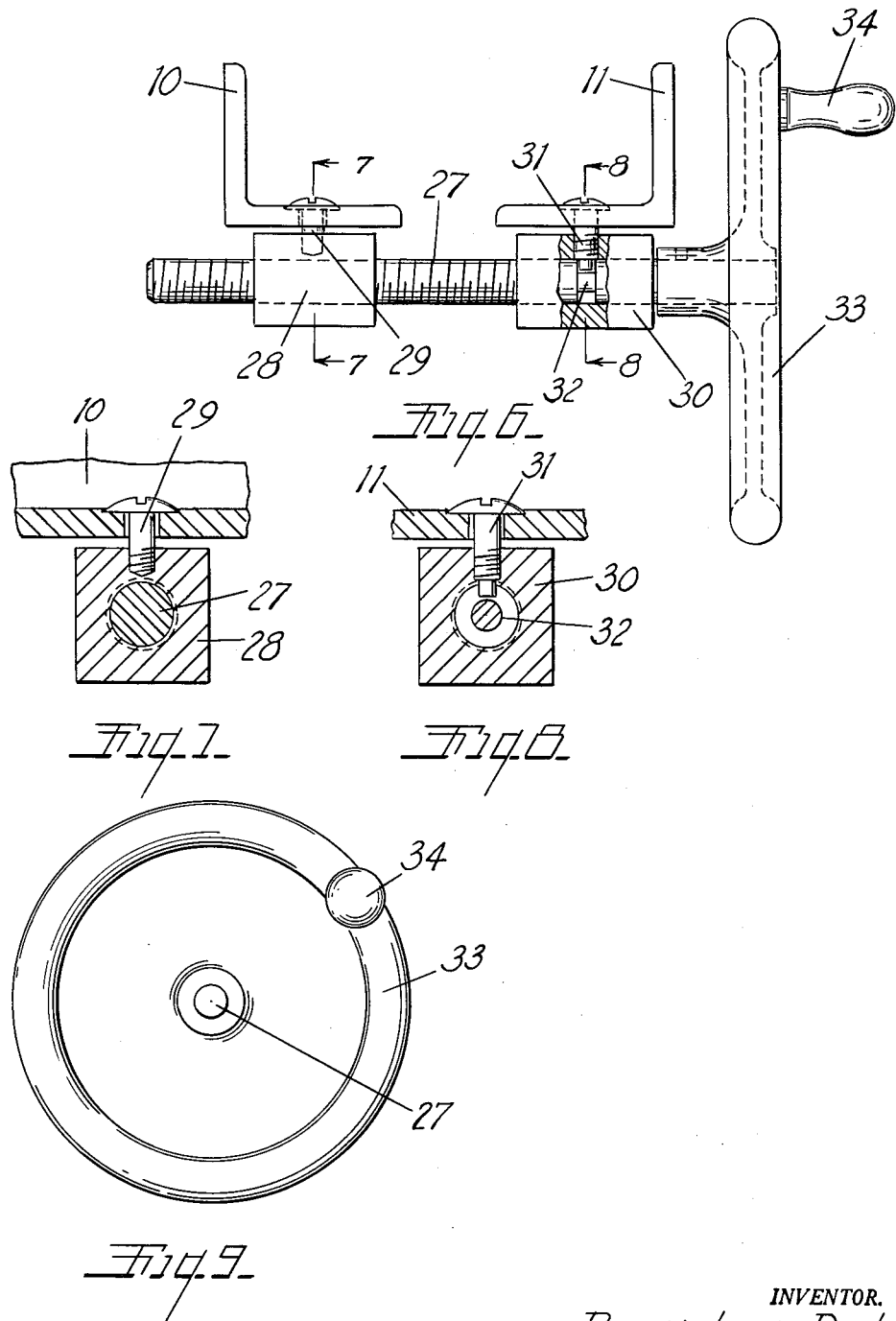
INVENTOR.
Roger L. Dickey
BY
ATTORNEY.

United States Patent Office 3,060,917
Patented Oct. 30, 1962

3,060,917
HOLDER FOR HANDLING STONE AND
THE LIKE
Roger L. Dickey, 1006 N. Richmond,
Hartford City, Ind.
Filed May 16, 1960, Ser. No. 29,271
15 Claims. (Cl. 125—35)

This invention relates to a work holder or jig well adapted for the handling of heavy material such as stone for work thereon.

The main objects of this invention are:

First, to provide a work holder including a frame and a jig well adapted for holding and manipulating heavy articles such as slabs or blocks of stone and which substantially reduces the manual efforts in handling the same.

Second, to provide a work holder having the aforesaid advantages which greatly facilitates work on the material and one which is capable of handling work of varying size.

Third, to provide a work holder of a class of the jig type which minimizes breakage of the material handled.

Fourth, to provide a structure having these advantages which is simple and economical to produce and at the same time is strong and durable.

Objects relating to details and economies of the invention will appear from the description to follow. The invention is defined and pointed out in the claims.

A preferred embodiment of the invention is illustrated in the accompanying drawing, in which:

FIG. 3 is an enlarged fragmentary view partially in vertical section on a line corresponding to line 3—3 of FIG. 1.

FIG. 4 is an enlarged fragmentary view in section on a line corresponding to line 4—4 of FIG. 1, the jig members being shown in retracted position and a piece of work being illustrated on the jig with the jig in fully open position.

FIG. 5 is a corresponding fragmentary view with the jig members in closed or work clamping position.

FIG. 6 is a fragmentary view partially in section of a modified form of jig member adjusting means.

FIG. 7 is a fragmentary view in section on a line corresponding to line 7—7 of FIG. 6.

FIG. 8 is a fragmentary view partially in section on a line corresponding to line 8—8 of FIG. 6.

FIG. 9 is a front view of the jig adjusting member of the embodiment of FIGS. 6 to 8.

Figure 1:
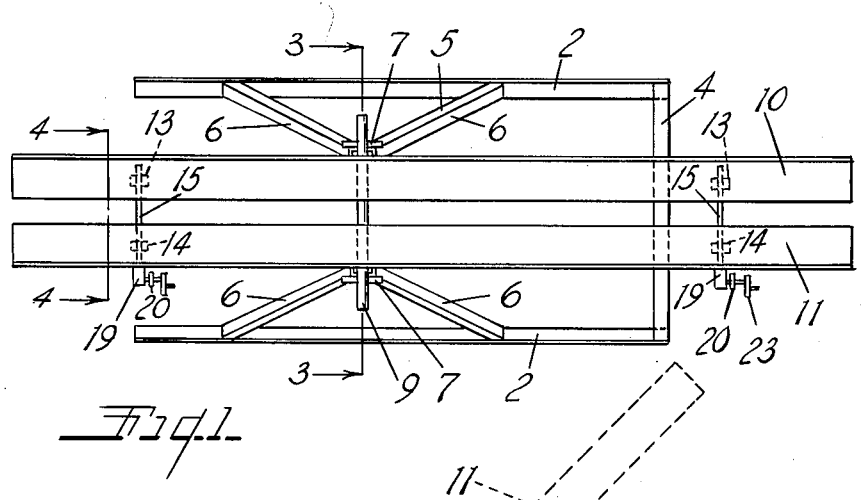
FIG. 1 is a plan view of a work holder embodying my invention.

The embodiment of my invention illustrated is adapted for the handling and facing of stone or like building material. It will be understood however that the work holder of my invention is adapted for holding other materials while being worked upon but it is especially desirable for the handling of heavy materials and as illustrated, a stone designated generally by the numeral 1 is slab-like in general shape.

The supporting frame comprises the base members 2 disposed in laterally spaced parallel relation, those illustrated being of upwardly and inwardly facing angled section. At one end the base members are provided with uprights 3 connected at their upper ends by the crosspiece 4 which constitutes a jig rest or support member. Spaced laterally relative to these uprights 3 are upwardly converging jig standards designated generally by the numeral 5 and formed of upwardly converging uprights 6, the upper ends of which are connected by the bearing members 7 having upwardly facing bearings 8 therein which are adapted to receive the rod-like jig support member 9.

The elongated jig members 10 and 11 are of upwardly and inwardly facing angled section. The rear jig member 10 is fixedly secured to the supporting rod 9 at 12 (see FIG. 3) and the front jig member 11 is slidably supported on the member 9. The jig members are provided with downwardly projecting pairs of aligned lugs 13 and 14, one pair of the lugs being disposed, at each side of the supporting rod 9 and substantially spaced therefrom (see FIGS. 1 and 2). Rods 15 are disposed through these lugs, the openings for the rods therein being dimensioned to permit some tilting movement of the rods. Coiled springs 16 are arranged on the rods at the rear of the rear lugs 13 in thrust engagement with the washers 17 retained upon the rods by means of pins 18. The front jig member is provided with forwardly projecting ears 19 disposed above the forward ends of the rods 15 and to which the actuating levers 20 are pivotally connected at 21. These levers are connected by the pivots 22 to the forward ends of the rods 15 so that by forward pull on the levers, the jig member 11 is forced towards the jig member 10 to clamp the work between the jig members. The jig locking members 23 in the embodiments of applicant's invention illustrated in FIGS. 1 to 5 inclusive are in the form of cammed wedges pivoted at 24 on the actuating levers 20 intermediate the pivotal connections for the levers to the ears 19 and to the rods 15. These lock members 23 are provided with laterally projecting hand pieces, see FIG 2, so that they may be manually adjusted to and from work locking position as shown in FIG. 5, or to work releasing position as shown in FIG. 4.

Figure 2:
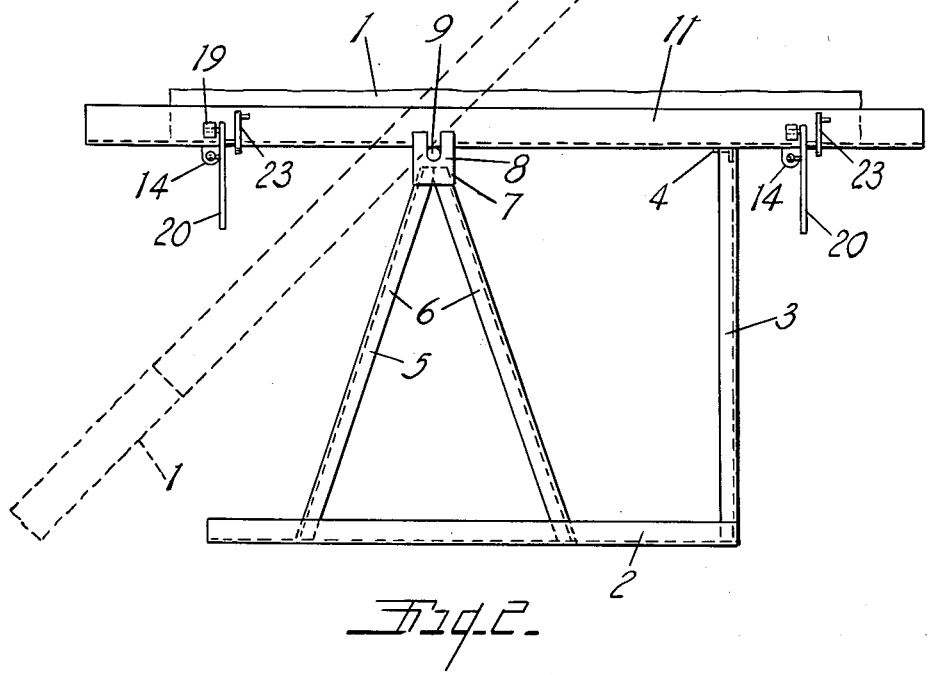
FIG. 2 is a side elevational view thereof with a piece of work shown in work position in full lines; a work discharging or severing position being indicated by dotted lines.

It will be noted that in the embodiment illustrated, the supporting rod 9 is off center relative to the length of the jig members so that when the jig is adjusted to work position as shown in FIGS. 1 and 2, the load in the jig acts to hold it in work position, however, the jig may be tilted, as indicated by dotted lines in FIG. 2, to receive or to discharge the work, the work being conventionally illustrated in FIG. 2 by dotted lines. The upper edges of the jig members are in the embodiment illustrated in the same plane and constitute gauges for tools such as a chisel indicated at 25 in FIG. 5. It should be understood, however, that the material worked and the work thereon may be very greatly varied.

The springs 16 provide effective clamping of the work which may vary in dimension even when rated or classed as the same. To retain the rods they are provided with stop pins 26 arranged in front of the lugs 13 (see FIGS. 4 and 5). However these pins 26 are desirably removable so that the rods can be pulled out or inserted when the pivots 22 connecting them to the lever 20 are removed.

In the embodiment shown in FIGS. 6 to 9 inclusive, screws 27 are provided for connecting the jig members 10 and 11, these screws having threaded engagement with the lugs 28 which are pivoted at 29 on the underside of the jig member 10 and they are rotatably engaged with the lugs 30 connected to the front jig member 11 by the screws 31 which also engage annular recesses 32 in the screws 27 which permit rotative adjustment of the screws. At the forward ends, the screws are provided with weighted hand wheels 33 desirably having handles or grips 34. These hand pieces 33 are weighted so as to facilitate adjustment of the screws, that is, a thrust toward clamping or retracting movement is ordinarily sufficient to clamp and release the work, avoiding the necessity of complete cranking movement.

It will be noted that in FIGS. 7 and 8 the holes in the jig members for the supporting screws 29 and 31 are slightly larger than the screws so as to permit some tilting and aligning movement of the screw support members 28 and 30.

Both embodiments illustrated are highly practical and I have not illustrated or described other embodiments or adaptations as it is believed that this disclosure will enable those skilled in the art to embody or adapt my invention as may be desired.

Having thus described the invention, what is claimed as new and desired to secure by Letters Patent is:

1. A work holder comprising a portable jig supporting frame including laterally spaced base bars, standards mounted on said base bars with their upper ends in laterally spaced relation and provided with upwardly facing bearings, said base bars having uprights thereon disposed in spaced relation to said standards and having a crosspiece thereon constituting a jig rest, elongated front and rear jig members of angled section disposed in upwardly and inwardly facing relation, a support member disposed transversely below said jig members and to which said rear jig member is fixedly connected, said support member being pivotally and removably engageable with said bearings on said standards, said jig members being provided with aligned pairs of downwardly projecting lugs disposed in laterally spaced relation to said support member, rods disposed through said lugs and projecting forwardly relative to the front jig member, springs on said rods arranged rearwardly of the lugs on the rear jig member and in thrust engagement therewith, said front jig member having forwardly projecting pivot ears thereon disposed above said rods, levers pivotally mounted on said ears and pivotally connected to said rods, and cammed wedge members pivotally mounted on said levers between their pivotal connections to said front jig member and to said rods for thrust engagement with the front jig member at points below the pivotal connections for the levers to the front jig member.

2. A work holder comprising a jig supporting frame support provided with upwardly facing laterally spaced bearings, elongated front and rear jig members of angled section disposed in upwardly and inwardly facing relation, a support member disposed transversely below said jig members and to which said rear jig member is fixedly connected, said support member being pivotally and removably engageable with said bearings on said support, said jig members being provided with aligned pairs of downwardly projecting lugs disposed in laterally spaced relation to said support member, rods disposed through said lugs and projecting forwardly relative to the front jig member, springs on said rods arranged rearwardly of the lugs on the rear jig member and in thrust engagement therewith, said front jig member having forwardly projecting pivot ears thereon disposed above said rods, levers pivotally mounted on said ears and pivotally connected to said rods, and cammed wedge members pivotally mounted on said levers between their pivotal connections to said front jig member and to said rods for thrust engagement with the front jig member at points below the pivotal connections for the levers to the front jig member.

3. A work holder comprising a jig supporting frame including laterally spaced base jars, standards mounted on said base bars with their upper ends in laterally spaced relation and provided with upwardly facing bearings, said base bars having uprights thereon disposed in spaced relation to said standards and having a crosspiece thereon constituting a jig rest, elongated front and rear jig members of angled section disposed in upwardly and inwardly facing relation, a support member for said jig members disposed transversely thereof and tiltingly engageable with said bearings on said standards, said jig members being provided with downwardly projecting lugs, a rod disposed through said lugs and projecting forwardly relative to the front jig member, a spring on said rod arranged rearwardly of the lug on the rear jig member and in thrust engagement therewith, said front jig member having a forwardly projecting pivot ear thereon disposed above said rod, a lever pivotally mounted on said ear and pivotally connected to said rod, and manually adjustable wedge members pivotally mounted on said lever between its pivotal connection to said front jig member and to said rod for engagement with the front jig member below the pivotal connection for the levers thereto.

4. A work holder comprising a jig supporting frame provided with bearings, elongated front and rear jig members of angled section disposed in upwardly and inwardly facing relation, a support member for said jig members disposed transversely thereof and tiltingly engageable with said bearings on said frame, said jig members being provided with downwardly projecting lugs, a rod disposed through said lugs and projecting forwardly relative to the front jig member, a spring on said rod arranged rearwardly of the lug on the rear jig member and in thrust engagement therewith, said front jig member having a forwardly projecting pivot ear thereon disposed above said rod, a lever pivotally mounted on said ear and pivotally connected to said rod, and manually adjustable wedge members pivotally mounted on said lever between its pivotal connection to said front jig member and to said rod for engagement with the front jig member below the pivotal connection for the levers thereto.

5. A work holder comprising a jig supporting frame including laterally spaced base bars, standards mounted on said base bars with their upper ends in laterally spaced relation and provided with upwardly facing bearings, said base bars having uprights thereon disposed in spaced relation to said standards and having a crosspiece thereon constituting a jig rest, elongated front and rear jig members of angled section disposed in upwardly and inwardly facing relation, a support member disposed transversely below said jig members and to which said rear jig member is connected, said support member being pivotally and removably engageable with said bearings on said standards, said jig members being provided with aligned pairs of downwardly projecting lugs disposed in laterally spaced relation to said support member, rods disposed through said lugs and projecting forwardly relative to the front jig member, springs on said rods arranged rearwardly of the lugs on the rear jig member and in thrust engagement therewith, levers operatively connected to said front jig member and said rods, and wedge members operatively connected to said levers for adjustment to and from operative engagement with the front jig member.

6. A work holder comprising a jig support provided with bearings, elongated front and rear jig members of angled section disposed in upwardly and inwardly facing relation, a support member disposed transversely below said jig members supportedly with said bearings on said standards, said jig members being provided with aligned pairs of downwardly projecting lugs disposed in laterally spaced relation to said support member, rods disposed through said lugs and projecting forwardly relative to the front jig member, springs on said rods arranged rearwardly of the lugs on the rear jig member and in thrust engagement therewith, levers operatively connected to said front jig member and said rods, and wedge members operatively connected to said levers for adjustment to and from operative engagement with the front jig member.

7. A work holder comprising a jig supporting frame, jig members of angled section disposed in upwardly and inwardly facing relation, a support member for said jig members disposed transversely thereof and tiltingly and removably engaged with said supporting frame, said jig members being supportedly associated with said support member for lateral adjustment relative to each other, and means for adjusting said jig members relative to each other comprising an adjusting screw disposed below and transversely of said jig members and rotatably and supportedly connected to one jig member and having supported and threaded connection to the other jig member.

8. A work holder comprising a jig supporting frame, jig members of angled section disposed in upwardly and inwardly facing relation, a support member for said jig members disposed transversely thereof and tiltingly engaged with said supporting frame, said jig members being supportedly associated with said support member for lateral adjustment relative to each other, and means for adjusting said jig members relative to each other comprising an adjusting screw disposed below and transversely of said jig members and rotatably and supportedly connected to one jig member and having supported and threaded connection to the other jig member.

9. A work holder comprising a jig supporting frame, pairs of jig members of angled section disposed in upwardly and inwardly facing relation, a support member for said jig members disposed transversely thereof and tiltingly and removably engaged with said supporting frame, said jig members being associated with said support member for lateral adjustment relative to each other, and means for adjusting said jig members relative to each other comprising an adjusting screw transversely of and disposed below said jig members and rotatably and supportedly connected to one jig member and having a supporting and threaded connection to the other jig member.

10. A jig comprising elongated front and rear members of angled section disposed in upwardly and inwardly facing relation, said jig members being provided with aligned pairs of downwardly projecting lugs, said pairs of lugs being disposed in laterally spaced relation, rods disposed through said lugs and projecting forwardly relative to the front jig member, springs on said rods arranged rearwardly of and in thrust engagement with said lugs on the rear jig member, said front jig member having forwardly projecting pivot ears thereon disposed above said rods, levers pivotally mounted on said pivot ears and pivotally connected to said rods, and cammed wedge members pivotally mounted on said levers between their said pivotal connection to said ears on said front jig member and to said rods for manual adjustment to and from engagement with said front jig members at points below the pivotal connection for the levers thereto.

11. A workholder comprising a jig supporting frame including laterally spaced base bars, standards mounted on said base bars with their upper ends in laterally spaced relation and provided with upwardly facing bearings, elongated work supporting and clamping jig members of angled section disposed in upwardly and inwardly facing relation to each other, a support member for said jig members disposed below and transversely of said jig members and with which one of said jig members is supportedly and fixedly connected and with which the other jig member is slidably and supportedly engaged for adjustment to and from the jig member connected to said support member, said support member being removably and tiltably engaged with said bearings on said standards, and manually manipulatable means for adjusting said laterally adjustable jig member to and from said jig member connected to said support member, said jig member adjusting means being supportedly mounted on said jig member and disposed in laterally spaced relation to said support member on opposite sides thereof.

12. A workholder comprising a jig supporting frame including standards disposed with their upper ends in laterally spaced relation, elongated work supporting and clamping jig members disposed in upwardly and inwardly facing relation to each other and supportedly and tiltably mounted on said standards and for lateral adjustment relative to each other, and manually operable means for adjusting said jig members laterally relative to each other disposed exteriorly of and supportedly mounted on said jig members, said jig members being of such length that they may be engaged with the surface with which said standards are supportedly engaged with the jig members in tilted position facilitating the loading and unloading thereof, said adjusting means for said jig members being supportedly mounted on said jig members so that the jig members and their adjusting means may be removed from said standards as a unit.

13. A workholder comprising a jig supporting frame including standards disposed with their upper ends in laterally spaced relation, elongated work supporting and clamping jig members disposed in upwardly and inwardly facing relation to each other and supportedly and tiltably mounted on said standards and for lateral adjustment relative to each other, and manually operable means for adjusting said jig members laterally relative to each other disposed exteriorly of and supportedly mounted on said jig members, said adjusting means for said jig members being supportedly mounted on said jig members so that the jig members and their adjusting means may be removed from said standards as a unit.

14. A workholder comprising a jig supporting frame including laterally spaced base bars, standards mounted on said base bars with their upper ends in laterally spaced relation, said base bars also having jig supporting uprights disposed in laterally spaced relation to said standards, elongated work supporting and clamping jig members disposed in upwardly and inwardly facing relation to each other and supportedly and tiltably mounted on said standards for adjustment to and from work clamping position, and manually manipulatable means for adjusting said jig members laterally to and from work clamping position disposed exteriorly of said jig members and in spaced relation to and on opposite sides of said support member.

15. A workholder comprising a jig supporting frame including standards disposed with their upper ends in laterally spaced relation, elongated work supporting and clamping jig members disposed in upwardly and inwardly facing relation to each other and supportedly and tiltably mounted on said standards and for lateral adjustment relative to each other, and manually operable means for adjusting said jig members laterally relative to each other disposed exteriorly of and supportedly mounted on said jig members, said jig members being of such length that they may be adjusted to supportedly engage the surface with which said standards are supportedly engaged with the jig members in tilted position facilitating the loading and unloading thereof.

References Cited in the file of this patent

UNITED STATES PATENTS

| | | |
|---|---|---|
| 1,079,697 | Flett | Nov. 25, 1913 |
| 1,335,721 | Bergstrom | Apr. 6, 1920 |
| 1,361,284 | Norris | Dec. 7, 1920 |
| 1,361,577 | Harboro | Dec. 7, 1920 |
| 1,415,895 | Obermiller | May 16, 1922 |
| 2,323,141 | Lancaster | June 29, 1943 |
| 2,427,133 | Grabner | Sept. 9, 1947 |
| 2,955,632 | Stone | Oct. 11, 1960 |